United States Patent [19]

Robin

[11] 4,382,907
[45] May 10, 1983

[54] LIQUID METAL COOLED NUCLEAR REACTOR

[75] Inventor: Marcel Robin, Sevres, France

[73] Assignee: Commissariat a l'Energie Atomique, Paris, France

[21] Appl. No.: 51,521

[22] Filed: Jun. 22, 1979

[30] Foreign Application Priority Data

Jun. 23, 1978 [FR] France .................. 78 18822

[51] Int. Cl.³ .......................................... G21C 19/32
[52] U.S. Cl. .................... 376/283; 376/310; 376/402; 376/299
[58] Field of Search ............ 176/37, 38, 65; 165/134; 376/310. 283, 402, 299

[56] References Cited

U.S. PATENT DOCUMENTS

| | | | |
|---|---|---|---|
| 3,260,649 | 7/1966 | Jens | 176/38 |
| 3,633,784 | 1/1972 | Taft | 176/38 |
| 3,718,539 | 2/1973 | West | 176/37 |
| 3,768,554 | 10/1973 | Stahl | 165/134 |
| 3,847,773 | 11/1974 | Ventre | 176/65 |
| 3,888,730 | 6/1975 | Jackson | 176/37 |
| 3,912,584 | 10/1975 | Rubinstein | 176/38 |
| 3,924,675 | 12/1975 | Essenbaggers | 176/38 |
| 3,941,586 | 3/1976 | McKee | 176/37 |
| 3,994,777 | 11/1976 | Severson | 176/38 |
| 4,129,476 | 12/1978 | Sammarone | 176/37 |
| 4,135,970 | 1/1979 | Mitsutsuka | 176/37 |
| 4,167,445 | 9/1979 | Aubert | 176/65 |

FOREIGN PATENT DOCUMENTS

| | | | |
|---|---|---|---|
| 2346868 | 3/1975 | Fed. Rep. of Germany . | |
| 2083482 | 12/1971 | France . | |
| 6800 | 6/1979 | France | 176/38 |
| 887252 | 1/1962 | United Kingdom | 176/38 |
| 985463 | 3/1965 | United Kingdom . | |
| 985464 | 3/1965 | United Kingdom . | |
| 1421826 | 1/1976 | United Kingdom . | |

OTHER PUBLICATIONS

Fast Reactor Technology; Plant Design, M.I.T. Press (1966) Yevick et al., ed. pp. 138–139, 144–145, 236.
Nuc. Eng. Int., vol. 23, No. 272, Jun. 1973, pp. 43–60.
Proposed Reference Design for the Clinch River Breeder Reactor Plant (Breeder Reactor Corporation 1974) pp. i, 17, 32–35, 38–40, 46–47, and 52–53 (hereinafter—CRBRP—).
Köhler & Rothfuss, The Reactor Tank of the SNR-300, (hereinafter—Köhler—).

*Primary Examiner*—Sal Cangialosi
*Attorney, Agent, or Firm*—Michael N. Meller; Anthony H. Handal

[57] ABSTRACT

The nuclear boiler comprises at least one heat exchanger located externally of the reactor vessel in order to effect heat exchange between the liquid metal coolant in the form of liquid and water to be vaporized and superheated together with a main storage tank connected to the reactor vessel for receiving liquid metal and inert gas. A main storage tank pipe system fitted with valves consists of a first overflow pipe for connecting the top of the reactor vessel to the bottom of the storage tank, and at least one second pressure-equalizing pipe between the top of the reactor vessel and the top of the storage tank. Controlled-atmosphere compartments forming the reactor containment structure and containing the unclear steam supply systems provide biological protection for operating personnel and guard against impacts of external origin.

6 Claims, 4 Drawing Figures

LIQUID METAL COOLED NUCLEAR REACTOR

BACKGROUND OF THE INVENTION

This invention relates to a liquid metal cooled nuclear steam supply system.

In more exact terms, the present invention relates to a nuclear reactor of an intermediate type between the conventional cooling-loop system and the so-called pool type system capable of being connected directly to a steam generator.

It is known that nuclear reactors which are cooled by liquid metal and in particular by liquid sodium or by a sodium-potassium mixture belong to two main types of reactor. On the one hand, there are the loop reactors such as Enrico Fermi in the United States and BN 350 in the Soviet Union. On the other hand, there are the so-called pool type reactors such as EBR2 in the United States, PFR in Great Britain and Phenix in France. All of them have an intermediate non-radioactive sodium system transferring heat from the main reactor vessel to the steam generator. In the second type of reactor, the primary liquid metal cooling circuit is entirely located within the vessel of the nuclear boiler. In more precise terms, this means that the reactor core neutron shielding, the primary pumps and the primary heat exchangers are all located within the reactor vessel itself. In the present state of the technique, this design concept makes it necessary to provide an intermediate cooling circuit for each heat exchange loop, the primary heat exchanger or so-called intermediate exchanger being associated by means of a secondary sodium system with a secondary exchanger or steam generator which carries out heat transfer between the secondary sodium and the water or steam which serves to actuate the turbines. Furthermore, the reactor comprises an outer vessel or so-called "main vessel" and an inner vessel or so-called "primary vessel". Said inner vessel which provides effective containment for the reactor core essentially serves to separate the "hot" liquid metal which leaves the reactor core from the "cold" liquid metal which leaves the heat exchangers and is reintroduced at the core inlet by the primary pumps. The French Phenix reactor can be mentioned as an example of this design concept.

In the first type of liquid metal cooled reactors or in other words the loop reactors, the reactor core neutron shielding, the intermediate heat exchangers and the primary pumps are located outside the inner reactor vessel which contains the reactor core.

An alternative design of loop reactor was disclosed in British Pat. Nos. 985,463 and 985,464. In this case the main vessel contains the reactor core alone. The neutron shields (graphite blocks) are located outside said vessel whilst the intermediate heat exchangers and the primary pump (and not the unit comprising heat exchanger, pump and steam generator) are housed within an auxiliary vessel which is connected to the main vessel by means of a duct provided with a coaxial pipe. Small-diameter pipes serve to connect the pump discharge outlet to the reactor diagrid and pass through the annular space of the coaxial pipes. No tank for storage of sodium and argon is provided and it is apparent that, unless the dimensions of the auxiliary tanks are considerably increased, the reserve supply of cold coolant is distinctly smaller than in the case of a semi-integrated reactor whose thermal inertia is much higher. The method employed for supporting the main vessel and the auxiliary vessels is also different and more conventional since they are suspended from the general biological shield roof of the reactor.

The invention is more especially concerned with the first type of liquid metal cooled reactor which has been mentioned but in which the secondary liquid metal circuit is dispensed with, that is to say reactors in which heat exchange takes place directly between the liquid metal which has passed through the reactor core and the water in the form of liquid and then steam.

The general arrangement of a cooling circuit of this type has already been described in French patent Application No. 77 03192 filed on Feb. 4th, 1977 in the name of the present Applicant in respect of "A pump and heat exchanger unit". This Application describes in particular a heat exchanger and pump unit for direct heat exchange between the primary liquid metal and the water.

SUMMARY OF THE INVENTION

The invention is preferably concerned in addition with the so-called semi-integrated reactors. Within the main vessel of a reactor of this type, provision is made for a primary vessel which serves on the one hand to support the reactor core and the neutron-absorbing materials for protecting the liquid metal within the main vessel, the heat exchanger/pump unit and the connecting ducts against neutron radiation emanating from the reactor core and, on the other hand, to isolate the hot liquid metal discharged from the reactor core with respect to the cold liquid metal which is admitted into the main vessel.

In more general terms, the present invention is concerned with a reactor of the loop type or preferably of the semi-integrated type which makes it possible to achieve a high degree of compactness of the nuclear steam supply system, namely of the entire installation up to the steam outlet.

A primary objective of the invention relating to this type of reactor in which no provision is made for an intermediate liquid metal circuit is to ensure reactor safety in regard to any operational faults which are liable to occur and especially in regard to any problems arising from reactions between the liquid metal (such as sodium, for example) and water within the exchanger unit in which heat is transferred between these two liquids.

More specifically, the invention relates to a nuclear steam supply system comprising:

a reactor vessel containing the reactor core, the neutron shields and associated devices as well as the liquid metal coolant, and an inert gas blanket, said reactor vessel being placed within a safety jacket;

at least one heat exchanger located externally of said reactor vessel in order to effect heat exchange between said liquid metal and water in liquid phase and then in the form of steam;

connecting means for establishing a two-way communication between said reactor vessel and said heat exchanger or heat exchangers;

a main storage tank connected to said reactor vessel for receiving said liquid metal and said inert gas;

said main storage tank being provided with a system of pipes consisting of at least:

one first overflow pipe for establishing a communication between the top portion of the reactor vessel and the bottom of said storage tank, at least a second pressure-equalizing pipe for establishing a communication between the top portion of the reactor vessel and the top portion of the main storage tank, said pipes being fitted with valves so as to ensure that, under normal operating conditions, said main storage tank communicates with said reactor vessel through the first and second pipes aforesaid;

a containment structure constituted by controlled-atmosphere compartments which contain said elements of said nuclear steam supply system and provide on the one hand biological protection of operating personnel and on the other hand protection against any impacts of external origin.

During reactor operation and by virtue of the fact that a permanent communication is established between the storage tank and the reactor vessel both for the liquid metal and for the inert gas, the result thereby achieved is to provide the equivalent of an expansion tank which serves to maintain a substantially constant pressure of the gas blanket in respect of the different operating regimes of the reactor.

In a preferred embodiment, the system of pipes further comprises a third pipe for filling said main storage tank with liquid metal, said third pipe being adapted to open on the one hand externally of said reactor containment structure and on the other hand within said main storage tank, a fourth pipe for filling with inert gas being provided for establishing a communication between an auxiliary tank for the storage of inert gas and said main storage tank, and a fifth pipe being provided for establishing a communication between the interior of said storage tank and the reactor vessel, said fifth pipe being fitted with means for circulating the liquid metal.

It is understood that the storage tank thus permits initial filling of the reactor vessel with liquid metal and formation of the gas blanket within said reactor vessel.

In accordance with another important characteristic feature of the nuclear steam supply system contemplated by the invention, the heat exchanger or each exchanger comprises an outer shell for the circulation of said liquid metal, said shell being provided with a safety jacket, and a discharge pipe for establishing a communication with the interior of said main shell through an obturating element which is capable of opening abruptly in the event of abnormal overpressure within said shell, said discharge pipe being so arranged as to have its opening at the top portion of said main storage tank, and the means for establishing a communication in the heat exchanger—reactor vessel direction are fitted with a closure device which can be closed in the event of a nominal reduction in level of liquid metal within said shell as a result of abrupt opening of said obturating elements, which also initiates dropping of the reactor safety rods and stopping of the pump which is associated with the faulty heat exchanger. An overpressure within the outer shell of the heat exchanger would take place in particular in the event of a violent sodium-water reaction within the heat exchanger. Moreover and in accordance with the invention, failure of the obturating element causes interruption of the connection between the heat exchanger and the reactor vessel in the direction corresponding to admission of liquid metal into said reactor vessel. Thus the hydrogen produced by the sodium-water reaction is directly drawn into the storage tank and, more specifically, into that portion of the tank which contains argon. It can thus be understood that the hydrogen is in no way liable to be entrained with the liquid metal (sodium) and to pass through the reactor core.

According to a further characteristic feature of the nuclear boiler contemplated by the invention, provision is made within the reactor vessel for at least one so-called decay-heat exchanger. The design function of said heat exchanger is to maintain cooling of the sodium even in the event of stoppage of all the pumps employed for circulating the liquid metal coolant.

The practical value of a liquid-metal cooled fast-neutron nuclear steam supply system of this type can immediately be understood. The advantages offered are those which arise in particular from considerably enhanced compactness of installations, both in comparison with reactors of the pool type in which the reactor vessel has a very large volume and therefore calls in particular for substantial quantities of liquid metal (liquid sodium, for example) and in comparison with fast reactors of the loop type. In this second type of reactor, the large surface area occupied by installations calls for the construction of a concrete containment of very large volume.

It should also be emphasized that part of the compactness obtained by means of the nuclear boiler according to the invention is related to the use of an exchanger unit in which heat is exchanged directly between the sodium or primary liquid metal (which is subject to activation by neutrons) and the water or steam employed in the turbines.

In the above-cited patent Application relating to double-walled pump/heat-exchanger units, it has been demonstrated that the probability of penetration of the water into the active primary sodium within these heat-exchanger units is practically negligible, taking into account the presence of double-walled tubes and leak detection systems. It is recalled that this probability is of the order of $10^{-7}$ or $10^{-6}$ according to the theories adopted. It is apparent that, even if it is not desired to overlook this probability, however remote it may be, and if it is also desired to guard against accidents such as earthquakes which would be liable to produce a violent reaction between the water and the sodium with production of hydrogen, the special arrangements made can overcome these difficulties. The reason for this lies in the fact that, as soon as an overpressure appears within the heat exchanger, the hydrogen thus produced is discharged into the main storage tank. The practical effect thereby achieved is to prevent introduction of the hydrogen into the primary circuit and in particular to prevent said hydrogen from passing through the reactor core, although neutron calculations have in fact shown that this would not be attended by unacceptable consequences. In other words, while permitting an increase in compactness of the fast-neutron nuclear steam supply system with respect to loop-type or pool type reactors, the same level of safety is maintained by virtue of the particular arrangements of the invention.

BRIEF DESCRIPTION OF THE DRAWINGS

A more complete understanding of the invention will in any case be obtained from the following description of one embodiment of the nuclear steam supply system according to the invention, this embodiment being given by way of example and not in any limiting sense. Reference will be made in the description to the accompanying drawings, wherein.

DESCRIPTION OF THE PREFERRED EMBODIMENTS

In the following description, reference will be made to a liquid metal cooled fast nuclear reactor of the semi-integrated type. However, it must be clearly understood that the general characteristics which will now be described would be equally applicable to a nuclear reactor of the loop type.

Figure 1:
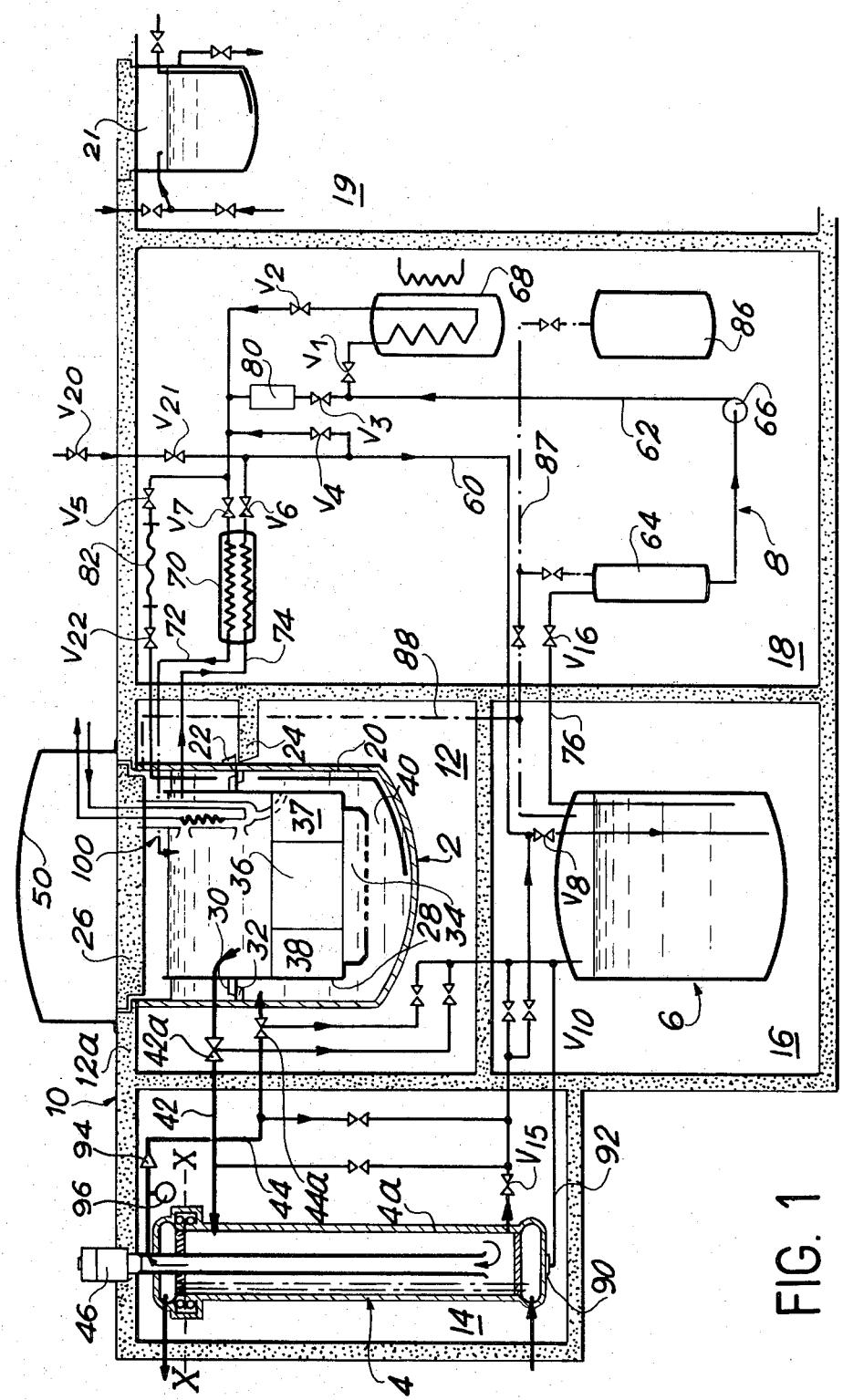
FIG. 1 is a general diagrammatic view of the complete nuclear boiler and shows the different parts and different connections relating to the circulation of liquid metal and to the circulation of inert gas.

Referring now to FIG. 1, it is apparent that the nuclear steam supply system essentially comprises a vessel designated by the general reference numeral 2, a pump-/heat exchanger unit 4 for exchanging heat between the liquid which circulates within the vessel and the water-steam circuit and a main storage tank 6. There is also shown a system of pipes for the liquid metal and for the inert gas, this system being designated by the general reference numeral 8.

It can also be seen that the assembly consisting of all these nuclear steam supply system elements is located within a concrete containment structure which bears the general reference 10 and is in fact constituted by a certain number of cell-type compartments which are isolated with respect to each other. The design function of said containment structure is on the one hand to provide biological protection for operating personnel and on the other hand to provide protection against the possibility of external impacting. For example, provision is made for a compartment 12 within which is housed the vessel 2 of the nuclear boiler and which is closed at the top by a concrete roof 12a, for a compartment 14 in which is housed the pump/heat-exchanger unit 4 (it is readily apparent that the number of compartments 14 within the boiler as a whole corresponds to the number of heat exchangers 4), for a bottom compartment 16 in which is housed the main storage tank 6, for a compartment 18 in which is housed the piping system 8; and lastly, provision is made, for example, for a compartment 19 in which is housed a tank 21 for the storage of fuel assemblies in liquid metal at the time of unloading and refuelling of the reactor core. Said storage tank 21 is of conventional type and will therefore not be further described in detail.

It will be considered in the following description that the liquid metal employed for cooling the reactor core and for transferring the heat energy produced by fission reactions consists of liquid sodium. As can readily be understood, it would not constitute any departure from the scope of the invention if the liquid metal employed consisted of another substance such as, for example, a mixture of sodium and potassium or a mixture of molten metal salts.

In the particular example described, the reactor vessel 2 is in fact constituted by a main outer vessel 20 carried on external support members 22 which in turn cooperate with concrete structural supports 24 forming part of the concrete walls of the compartment 12. Said main vessel 20 is closed at the top by a concrete roof slab 26 which rests in leak-tight manner on the top edge of the main vessel 20. Moreover, the roof slab 26 is provided with a system for maintaining a leak-tight seal with the concrete roof 12a. Provision is made within the main vessel 20 for a primary vessel 28 which is supported by said main vessel 20 by means of peripheral supporting devices 30; said devices cooperate with supporting elements 32 which are fixed on the internal wall of the main vessel 20. It is important to note that the supporting elements 22 and 30, 32 are placed in the same supporting plane X–X'. The primary vessel 28 is provided with a bottom support grid 34 usually known as a diagrid which supports the reactor core 36 and the lateral neutron shields 37 while permitting the circulation of liquid metal through the reactor core 36, the fissile assemblies of the core being provided with axial neutron shields. The lateral neutron shields are constituted by removable assemblies which are similar in shape to the reactor core fuel assemblies but contain neutron-absorbing material (boron or boron compounds) instead of the fissile material. These shield assemblies are placed around the reactor core and positioned in the diagrid in the same manner as the fissile assemblies. Devices for handling fuel and controlling the reactor are of a well-known type and have therefore been omitted from the figure for the sake of enhanced clarity. In addition, the side walls of the main vessel 20 and of the primary vessel 28 define between them an annular space 38 and the bottom end-walls of these latter define a bottom space 40. Circulation of liquid sodium between the reactor vessel 2 and each heat exchanger 4 is effected by means of an outlet duct 42 which establishes a communication between the top portion of the primary vessel and the heat-exchanger inlet, and by means of a duct 44 which establishes a communication between the outlet of the pump which is integrated with said heat exchanger and the annular space 38 formed between the two vessels. It can thus be understood that the circulation of liquid sodium takes place as follows: it passes through the reactor core 36, undergoes a temperature rise and thus penetrates into the upper portion of the inner vessel. Said hot sodium is recirculated through the duct 42, introduced into the heat exchanger 4 and cooled, then discharged through the duct 44 which reintroduces the cold sodium into the annular space 38 by virtue of the presence of the circulating pump 46 associated with the heat exchanger 4. The ducts 42 and 44 are fitted with double-disc isolating valves 42a and 44a so that one heat exchanger 4 can thus be completely separated from the reactor vessel 2 in the event of a fault occurrence in the heat exchanger. Preferably, the pump 46 is integrated in said heat exchanger. It is important to note that, compared with a nuclear boiler of the loop type, the cold sodium is introduced into the vessel 2 within an internal space which has a very large volume since this latter is constituted by the annular space 38 and the space 40 formed between the bottom end-walls of the main vessel and primary vessel. It is known that, on the contrary, in the case of loop-type reactors, said internal space is very limited since the cold sodium must be injected directly at the base of the reactor core by means of pipes. It is thus apparent that safety considerations dictate the need for a large volume of cold sodium which ensures suitable thermal inertia. It should be added that, again for safety reasons, the slab 26 of the containment roof 12a can be surmounted by a dome 50 which constitutes a second safety containment.

The main storage vessel 6 has the same structure as the main reactor vessel 20. The storage tank 6 has a sufficient capacity to contain the entire quantity of sodium of the main and primary vessels above the level of the reactor core 36 in addition to the sodium normally contained in the heat extraction loops, or else a sufficient fraction of the volume of the main vessel and of the coolant circuits to permit of inspection by camera above the reactor core. It should be noted that said storage tank can be provided in actual practice by reason of the smaller dimensions of the main vessel since the necessary volume of sodium is smaller than the volume provided in an integrated reactor having a similar power rating.

The main storage tank 6 can serve first of all for initial filling of the reactor vessel with sodium. The tank 6 is connected to the pipe 60 which passes through the concrete roof 12a and therefore emerges outside the concrete containment structure. Said pipe 60 is fitted with the valves $V_8$, $V_{21}$ and $V_{20}$, the intended function of the valve $V_{21}$ being to prevent any hot sodium from rising above the concrete roof 12a during reactor operation. There is also shown in the figure a pipe 62 which forms part of the sodium purification circuit. Said pipe 62 is fitted with a shut-off valve $V_{16}$, a pump-priming tank 64, a pump 66 and a cold trap 68 of conventional type. Provision is also made for an economizer 70 mounted in the pipes 72 and 74 which have their openings in the upper portion of the primary vessel and are fitted with valves $V_7$ and $V_6$. This arrangement forestalls any danger of accidental dumping of liquid metal from the main vessel.

Initial filling of the reactor vessel is carried out in four main steps: filling of the main tank 6; purification of the sodium; filling of the reactor vessel; and complementary filling of the storage tank 6 with sodium.

In order to proceed with the first step, the valves $V_{20}$, $V_{21}$, $V_8$ are opened and the valves $V_4$, $V_5$, $V_6$ and $V_{10}$ are closed. The sodium at a temperature of the order of 150° C. is introduced into the storage tank 6 through the pipe 60 until it reaches a maximum level within said tank. For the second step (sodium purification), the valves $V_1$, $V_2$, $V_4$, $V_8$ and $V_{16}$ are opened whereas the valves $V_{21}$, $V_6$, $V_7$ are closed. The sodium is withdrawn through the pipe 76 under the action of the electromagnetic pump 66 which delivers the sodium to the cold trap 68. The sodium is returned to the storage tank 6 through the pipe 60. An indicator 80 associated with the valve $V_3$ serves to control the sodium purification. When the liquid sodium has attained a sufficient degree of purity, the next operation consists in filling the reactor vessel 2. To this end, the valve $V_8$ is closed, thus preventing the sodium from returning to the storage tank 6. The valves $V_5$ and $V_{22}$ are opened, thus putting the vessel-filling pipe 82 in service. When the maximum level is reached, the valves $V_{10}$ and $V_{15}$ are also opened in order to fill the auxiliary circuits of the installation. In a fourth step, filling of the storage tank 6 with sodium is completed after purification of this latter.

When the sodium-loading operation is completed, the valves $V_7$ and $V_6$ of the economizer 70 as well as the valve $V_8$ are opened and the valves $V_4$, $V_{10}$, $V_{15}$ are closed, followed by the valves $V_5$ and $V_{22}$. This situation corresponds to normal reactor operation. The purification system operates in its usual regime. The sodium of the reactor vessel 2 is discharged as overflow through the pipes 74 and 60 and into the storage tank 6 via the economizer 70. The pump then directs the sodium first to the cold trap 68, then to the economizer, whereupon the sodium returns into the reactor vessel through the pipe 72. It should be noted that the pipes 72 and 74 have their openings at the upper end of the primary vessel 28 in order to prevent a phenomenon of siphoning of sodium in the event of failure of this circuit. With the same objective, the pipe 82 is provided between the valves $V_5$ and $V_{22}$ with a portion which is removed after initial filling of the reactor vessel. Plugs can be fitted in order to guard against any faulty leak-tightness of the valves $V_5$ and $V_{22}$.

As stated earlier, provision is made within the reactor vessel above the free level of sodium for a blanket of inert gas consisting, for example, of argon. This argon circuit essentially comprises the secondary argon storage tank 86 which is connected through the pipe 87 to the top portion of the main storage tank 6 and to the reactor vessel 2 by means of the pipe 88.

The pipe 88 has a large diameter (600 mm, for example). The members of this pipe are quadrupled so that argon pressure equilibrium between the reactor vessel 2 and the storage tank 6 is virtually established even dynamically. This arrangement is intended to limit overpressure within the main vessel 2 in the event of any accidental power excursion within the reactor core. It is also possible by means of this arrangement to limit the argon pressure within the main vessel due to the temperature increase at the time of run-up to the rated power of the reactor. The argon circuit can also be provided with a purification system. It can thus be understood that the storage tank 6 performs the function of a pressure-limiting tank for the argon and the function of an overflow for the sodium.

It should be mentioned in addition that a nitrogen atmosphere is provided within all the compartments of the concrete containment structure which house the different components of the installation. Valves serve to interrupt the supply of nitrogen and to replace this latter by air in order to permit servicing or remedial work on these different components after dumping of the liquid sodium.

As already mentioned, the nuclear boiler also comprises circuits for ensuring safety of the installation even in the event of a sodium-water reaction within the heat exchangers despite the extremely low probability of such a reaction.

An accidental reaction of this type produces an overpressure within the outer shell 4a of the heat exchanger in which the liquid sodium is circulated. Preferably, the shell 4a is duplicated by a safety jacket. Said shell 4a is fitted with a plurality of bursting discs such as the disc 90 which fail at the end of a few tens of milliseconds after the hydrogen pressure peak resulting from the sodium-water reaction. This failure results in the opening of an electric circuit, in dropping of the reactor safety rods (not shown) and in stoppage of the pump 46 which is associated with the faulty heat exchanger. Failure of the bursting disc 90 puts the interior of the shell 4a into communication with the discharge pipe 92 which opens into the main storage tank 6. A regulating valve (not shown) serves to limit the pressure within the storage tank 6 in the event of overpressure caused, for example, by operation of the discharge pipe 92. The gases which escape from the storage tank 6 are recovered within the compartment 16 which contains an inert gas atmosphere. It is thus understood that the hydrogen is discharged directly into the storage tank 6. Furthermore, the main cold-sodium outlet duct 44 is fitted with a non-return valve 94. In the event of failure of the bursting discs, the non-return valve 94 closes under the action of the sodium pressure within the collector 38 and stops the circulation of sodium while at the same time preventing the introduction of hydrogen into the reactor core.

Moreover, in order to ensure safety in the event of small leakages of hydrogen, provision can be made for a hydrogen detector 96 in the duct 42. Said hydrogen detection results in dropping of the safety rods, in dumping of the heat-exchanger water and in stoppage of the associated pump.

Figure 4:
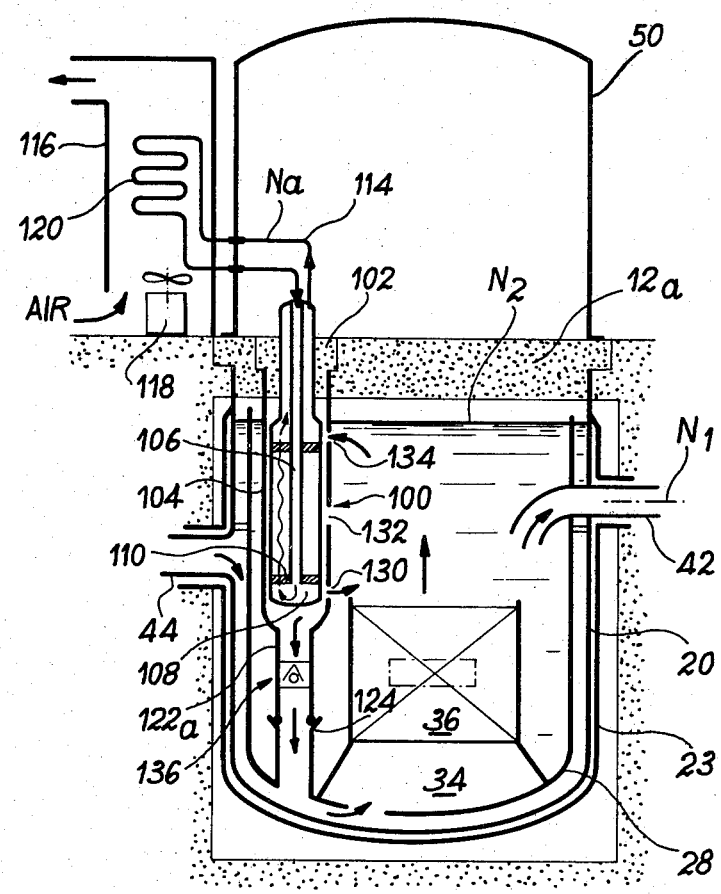
FIG. 4 is a more detailed view of the vessel of the nuclear boiler and shows in particular the location of a decay heat exchanger.

As indicated in the foregoing, the vessel of the nuclear boiler is provided with at least one residual heat exchanger 100 which is illustrated in greater detail in FIG. 4. The design function of this exchanger is to remove the residual power when the normal heat extraction circuits are not available.

Preferably, the complete installation comprises four residual-power exchangers 100 suspended from small shield plugs such as the plug 102 which pass through the roof slab 26 in leak-tight manner.

The heat exchanger 100 comprises an outer shell 104 which is directly suspended from the shield plug 102. Said shell is endowed with high mechanical strength in order to protect the internal components of the heat exchanger 100 in the event of a power excursion within the reactor vessel. This heat exchanger is clearly of the sodium-sodium type. The secondary sodium is admitted through the duct 106, then into the lower space 108 which is limited by the tube plate 110 and passes through the heat exchange tubes 112, then finally passes out through the pipe 114. The heat is extracted from the secondary sodium through a sodium-air exchanger of conventional type as represented by the stack 116 whilst the blower 118 and the tube coils 120 form part of the secondary sodium circuit. The outer shell 104 has a lower extension in the form of a duct constituted by a first portion 122a which is rigidly fixed to the shell 104 and by a second portion 122b which is rigidly fixed to the primary vessel 28 and has its opening in the vicinity of the diagrid 34. The junction between the two portions of duct is made by means of a semi-leaktight O-ring seal 124 which constitutes a knuckle-joint element and thus serves to compensate for a certain angle of inclination of the heat-exchanger unit 100 and to remove this latter by withdrawing it through the orifice which carries the shield plug 102.

The outer shell 104 is provided with three series of orifices: outlet orifices 130 placed immediately above the reactor core 36, first inlet orifices 132 placed at a height corresponding to the residual level $N_1$ of sodium within the primary vessel and second inlet orifices 134 placed at a height corresponding to the normal level $N_2$ of sodium within the primary vessel. The duct 122a, 122b is fitted with a non-return valve 136 which is closed during operation of at least one main sodium circuit.

Taking into account this arrangement of the orifices and the fact that the valve 136 is normally closed (during normal reactor operation), a small flow of primary sodium circulates continuously within the shell 104 as a result of the difference in height of the inlet and outlet orifices.

When the normal cooling circuits are no longer in operation, the discharge pressure of the pumps is no longer maintained at the lower reactor-core inlet. This pressure drop causes the valve 136 to open. In this case, after it has passed through the heat exchanger 100, the primary sodium is fed back into the lower portion of the reactor core through the duct 122a, 122b. The double series of inlet orifices serves to ensure this circulation even in the event of a drop in sodium level. It should be added that, instead of having a valve 136 which opens automatically in the event of a pressure drop, it would be possible to employ a shutter controlled by a motor, the motor being in turn controlled by a pressure transducer which is responsive to the pressure prevailing at 38.

In the event that the reactor is not of the semi-integrated type but of the loop type, that is to say in the event that no provision is made for a primary vessel 28, the duct 122a, 122b is connected directly to the reactor core diagrid.

In addition, FIG. 4 shows the safety jacket 23 which duplicates the main vessel 20. This jacket serves to collect the sodium in the event of leakages into the main vessel. The lower level $N_1$ corresponds to the case of leakage through the wall 20 when the jacket 23 is filled with sodium.

Figure 3:
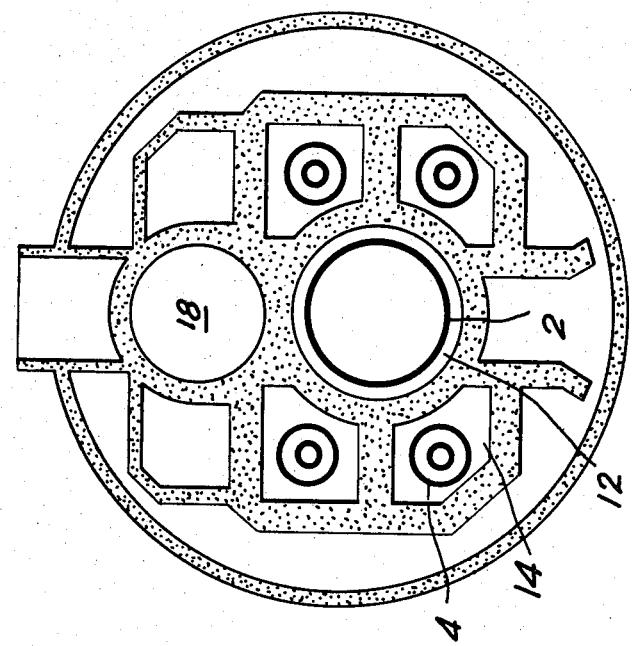
FIGS. 2 and 3 are vertical and horizontal sectional views showing a concrete example of construction of the nuclear boiler and illustrating in particular the remarkable compactness of this installation.
Figure 2:
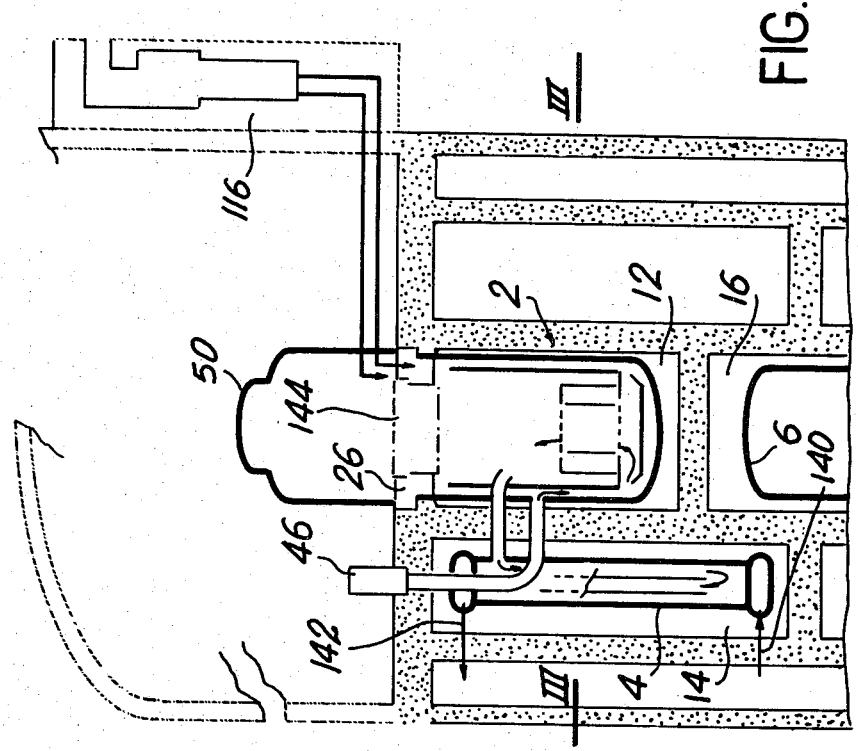

FIG. 1 had shown the complete boiler system only in order to provide a clearer understanding of the general arrangement and operation. FIGS. 2 and 3 show a specific form of construction which provides a better illustration of the compactness of the nuclear boiler, this compactness being obtained by virtue of the characteristics of the reactor according to the invention. There is again shown the concrete containment structure and the entire boiler system within this latter, including the ducts 140 and 142 for admission and discharge of water-steam into and from the heat exchangers 4. The different compartments 12, 14, 16 and 18 which are arranged for receiving the different boiler components and isolating them from each other are also more clearly visible. Lastly, these figures show the rotating shield plug 144 which is mounted within the roof slab 26 and permits fuel-assembly handling operations.

I claim:

1. A liquid metal cooled nuclear reactor steam generating system without an intermediate sodium system comprising:
    (a) a reactor vessel containing a reactor core, and associated neutron shields as well as liquid metal coolant, an inert gas blanket with said reactor vessel being placed within a safety jacket;
    (b) at least one heat exchanger located externally of said reactor vessel in order to effect heat exchange between said liquid metal and liquid water thus turned to steam;
    (c) piping means for establishing a two-way communication between said reactor vessel and said heat exchanger or heat exchangers;
    (d) a main storage tank connected to said reactor vessel for receiving said liquid metal and said inert gas;
    (e) said main storage tank being provided with a system of pipes consisting of at least:
        (i) one first overflow pipe to connect the top portion of the reactor vessel and the bottom of said storage tank,
        (ii) a second pressure-equalizing pipe having a diameter large enough to take care of sudden pressure differences to connect the top portion of the reactor vessel and the top portion of the main storage tank, said pipes being fitted with valves so as to ensure that under steady state operating conditions, said main storage tank communicates with said reactor vessel through said first and second pipes;

(iii) a third pipe for filling said main storage tank with liquid metal, said third pipe connecting an external source with said main storage tank;
(iv) a fourth pipe for connection with inert gas storage means of tank and said main storage tank;
(v) a fifth pipe to connect between the interior of said storage tank and the reactor vessel, said fifth pipe being fitted with means for circulating and purifying the liquid metal; and (f) a containment structure constituted by controlled-atmosphere compartments which contain said reactor, heat exchanger and main storage tank to provide radiation protection for operating personnel and provide protection against impacts of external origin;

(g) said heat exchanger comprising an outer shell for the circulation of said liquid metal, said shell being provided with a safety jacket and a discharge pipe to connect with the interior of said main shell through a bursting disc which opens abruptly in the event of abnormal overpressure within said shell, said discharge pipe arranged as to have its opening at the top portion of said main storage tank, and wherein the means for establishing a communication in the heat exchanger-reactor vessel direction are fitted with a valve which is closed in the event of an abnormal pressure drop within said shell as a result of the abrupt opening of said bursting disc.

2. A nuclear reactor system as in claim 1, wherein said main storage tank is provided at the upper portion thereof with a discharge valve which is capable of opening in the event of overpressure within said main storage tank.

3. A nuclear reactor system as in claim 1, wherein said system comprises at least one auxiliary heat exchanger placed in the liquid metal coolant within the interior of said reactor vessel, said auxiliary heat exchanger being provided with an outer shell in which said liquid metal can be circulated, said shell being provided with at lease one inlet orifice located at a first level slightly below the normal level of liquid metal within said reactor vessel, at least one second inlet orifice located at a second level slightly below the lowest level occupied by the liquid metal within the vessel corresponding to filling of the safety jacket with liquid metal by reason of leakages within said vessel, at least one third outlet orifice located immediately above the reactor core, and a duct for establishing a communication between the lower portion of said shell and the lower portion of said reactor core, said duct being provided with closure means designed to open only in the event of a pressure drop within the main reactor vessel.

4. A nuclear reactor system as in claim 3, wherein said auxiliary heat exchanger is suspended from said roof slab and wherein said duct for establishing a communication between the outer shell of said auxiliary heat exchanger consists of a first portion of duct which is rigidly fixed to the primary vessel, the two portions of duct being joined together by means of a knuckle-joint seal.

5. A nuclear reactor system as in claim 1, wherein said fifth pipe is provided with means for purification of said liquid metal.

6. A nuclear reactor system as in claim 1, wherein the pressure equalizing pipe between the top portion of the reactor vessel and the main storage tank is of the order of 600 mm, in diameter.

* * * * *